Oct. 9, 1923.

M. M. WILCOX 1,470,041

METHOD OF MAKING POPPET VALVES

Filed Jan. 11, 1921

Merrill M. Wilcox
INVENTOR

BY

Geo. B. Willcox
ATTORNEY

Patented Oct. 9, 1923.

1,470,041

UNITED STATES PATENT OFFICE.

MERRILL M. WILCOX, OF SAGINAW, MICHIGAN, ASSIGNOR TO WILCOX MOTOR PARTS & MANUFACTURING CO., OF SAGINAW, MICHIGAN, A CORPORATION OF MICHIGAN.

METHOD OF MAKING POPPET VALVES.

Application filed January 11, 1921. Serial No. 436,415.

*To all whom it may concern:*

Be it known that I, MERRILL M. WILCOX, a citizen of the United States, residing at Saginaw, in the county of Saginaw and State of Michigan, have invented certain new and useful Improvements in Methods of Making Poppet Valves; and I do hereby declare the following to be a full, clear, and exact description of the invention, such as will enable others skilled in the art to which it appertains to make and use the same.

This invention relates to poppet valves and pertains more particularly to an improved construction of poppet valve whereby the objects of my invention are accomplished.

These objects are to provide as an article of manufacture a poppet valve having a head of cast iron and a stem of steel, or any suitable combination of equivalent materials, the construction of the valve being such that the head and stem can be quickly secured together in fixed relation during the first operation of assembling and then welded together in such manner that the original fixed relation will not become disturbed during the welding process, thereby maintaining an accurately pre-determined or standard length for the completed valve, this correct length being an essential requirement in the production of valves for internal combustion engines.

Heretofore it has been customary to assemble apertured cast iron heads and steel stems and to fix the heads to the stems by welding with the oxy-acetylene blow torch, or equivalent means, the amount of metal required to fill the cavity above the end of the stem and below the top of the head being supplied either by employing excess metal of the stem, or by using an auxiliary welding rod.

In some cases the stem has been secured to the head by threading and then riveting the end of the stem to prevent unscrewing. In other cases the end of the stem has been formed with corrugations, the corrugated end being forced into the head, and the end of the stem then being welded to the head by the oxy-acetylene process.

I have found in practice, however, that both of the above methods, which are common in the art, are liable to either permit a relative longitudinal movement of the head with relation to the stem during the welding process, or else loosen the thread during the riveting process.

Heretofore the quickest and most economical method of manufacturing poppet valves of the class described has been to cut the stems to a predetermined length, rapidly inserting the stems by pressing into the heads and then securing the stems to the heads by welding and finally cutting the stems to the correct length. It has been found in practice, however, that welding with the oxy-acetylene blow torch and filling in the cavity with molten metal is a relatively slow process and one requiring a considerable degree of skill on the part of the operator. It has also been found that the electric welding process as heretofore carried out involves liability of permitting relative longitudinal movement between the head and the stem, resulting in the production of valves of unequal length, that require to be cut to correct length before completion.

In my improved valve I combine the advantages of the above-mentioned operations and in addition am enabled to assemble valves at a rapid rate and to permanently secure the stems to the heads with a very small amount of labor, the completed valves being of commercially accurate overall length.

My improved construction, by which these objects are attained, is illustrated in the accompanying drawing, in which Fig. 1 is a side view, partly in section, showing my improved valve construction assembled in the welding electrodes.

Figure 2:
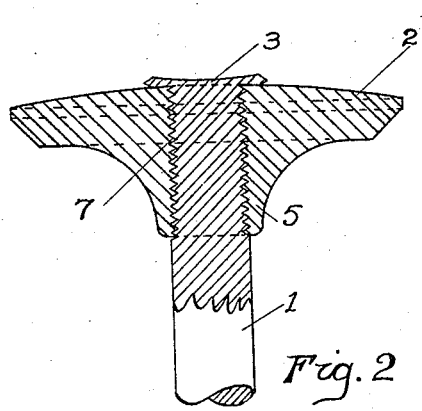
Fig. 2 is a part sectional view after welding.
Figure 1:
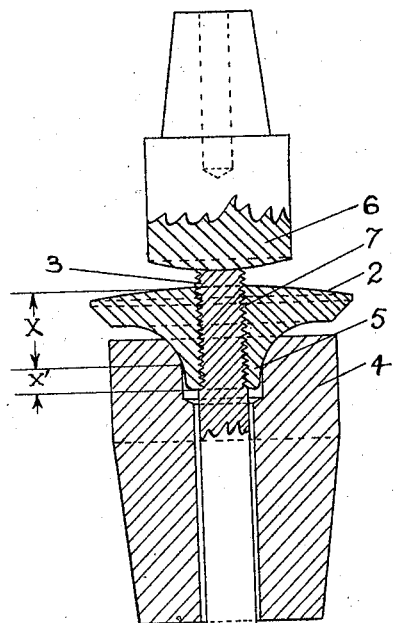
Figure 3:
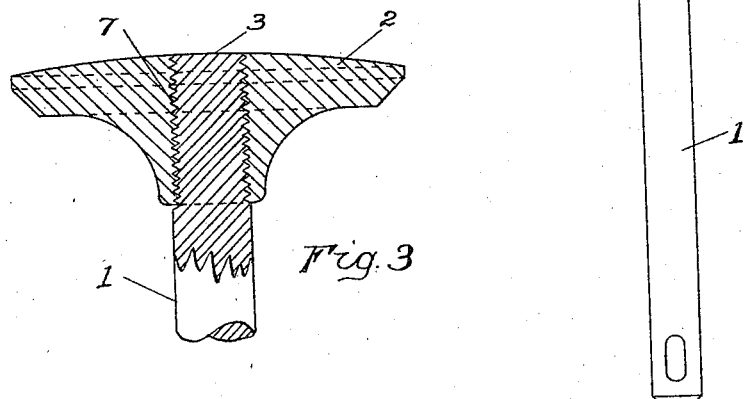
Fig. 3 is a similar view showing the finished valve.

I provide a threaded stem 1 which is preferably first cut to the desired length. The threaded end of the stem is screwed tightly into the internally threaded head 2, so that the end 3 of the stem projects slightly above the top of the head 2. The lower annular electrode 4 of an electric welding machine is then applied to the boss 5 of the head 2, preferably slightly above the lower end of the boss as shown in Fig. 1, and the upper electrode 6 is placed against the slightly projecting end of the stem 3, as indicated in Fig. 1, and current is applied. The upper and lower electrodes are then forced together. The current traversing the end of the stem and the head melts the metal of the surfaces only of the threads on the stem and head, and when these two surfaces reach the melting point the film of metal between the two threaded surfaces, being tightly squeezed by the pressure of the two electrodes, unites them without melting the threads themselves. Upon cooling, the thread is found to be so securely welded to the head that it is impossible to unscrew the stem. Yet the contour of the threads is preserved and their strength to resist the pulling apart of the head and stem is unimpaired.

It will be observed that without the threads, when the lower electrode 4 and the upper electrode 6 are forced together there would normally be a tendency for the stem to shift longitudinally with respect to the head, but since the internally threaded head is first screwed tightly on the stem, and since the spot welding in my preferred arrangement does not melt or soften the threads below the path of least resistance of the current, which is approximately as low as the contact point of the lower electrode, it is not possible for any longitudinal movement of the stem with respect to the head to occur. This is especially evident when it is remembered that the welding effect will take place only for approximately the distance indicated by the letter X in Fig. 1, that is, for the length of the thread which lies between the end of the upper electrode and the points of contact of the lower electrode and the boss 5. Therefore, if the lower electrode is applied above the lower extremity of the boss, as shown in Fig. 1, that part of the thread marked X' will not be subject to welding heat and consequently will prevent any lengthwise relative movement of the head and stem, even though the part X of the thread were by accident to become overheated. Furthermore, since the lower threaded part prevents slipping, the pressure of the upper electrode has the effect of spreading or expanding the threads of the stem which are at welding heat, and to firmly unite them with the melted surfaces of the threads of the head.

In the drawing, 7 indicates the film of metal which is melted between the threads of the head and the threads of the stem.

While I have illustrated the lower electrode 4 as being applied above the lower extremity of boss 5, in order that the lower threads X' may not become heated to a welding temperature, yet I may when desired, apply the electrode 4 at the lower end of boss 5 and then weld the head throughout the entire length of its thread.

Having thus described my invention, what I claim and desire to secure by Letters Patent is:

1. The herein described method of making poppet valves, said method consisting in forming screw threads on the valve stem and in the bore of the head, screwing the head upon the stem and uniting said head and stem by welding, whereby the surface metal of some of the threads of said head and stem is brought to a welding heat, said threads preventing relative lengthwise movement of said stem and head during the welding operation.

2. The herein described method of making poppet valves, said method comprising internally threading said head and stem and screwing them together, said head and stem united by electric welding, whereby the surface metal of some of the threads of said stem is brought to a welding heat and the surface metal of other of said threads is not fused, thereby holding said head and stem against relative lengthwise movement during the welding operation.

3. The herein described method of making poppet valves comprising internally threading the head and stem of said valve, screwing said stem into said head and permitting the stem to project therethrough, uniting said head and stem by electric welding, whereby the surface metal of some of the threads near the outer end of the threaded portion of said stem is brought to a welding heat and whereby the surface metal of other of said threads is not fused, thereby preventing relative lengthwise movement of said stem and head during the welding operation.

In testimony whereof I affix my signature in presence of two witnesses.

MERRILL M. WILCOX.

Witnesses:
T. E. BORDEN,
ARTHUR A. SCHUPP.